United States Patent
Koriyama et al.

(10) Patent No.: US 6,716,463 B1
(45) Date of Patent: Apr. 6, 2004

(54) COATING AGENT FOR COOKING RANGE HEATED FROZEN FOOD COMPRISING CORE FOOD AND LAYER OF COATING, AND FOOD USING THE SAME

(75) Inventors: Tsuyoshi Koriyama, Mitaka (JP); Satoshi Nakamura, Hachioji (JP)

(73) Assignee: Nippon Suisan Kaisha, Ltd, Tokyo (JP)

( * ) Notice: Subject to any disclaimer, the term of this patent is extended or adjusted under 35 U.S.C. 154(b) by 0 days.

(21) Appl. No.: 09/555,644

(22) PCT Filed: Dec. 3, 1998

(86) PCT No.: PCT/JP98/05459

§ 371 (c)(1),
(2), (4) Date: Jul. 31, 2000

(87) PCT Pub. No.: WO99/27800

PCT Pub. Date: Jun. 10, 1999

(30) Foreign Application Priority Data

Dec. 3, 1997 (JP) ............................................. 9/348475

(51) Int. Cl.[7] ......................... A23B 4/09; A23L 3/3517; A23L 1/31
(52) U.S. Cl. ........................... 426/97; 426/98; 426/100; 426/139; 426/133; 426/291; 426/289; 426/302; 252/194
(58) Field of Search ............................. 252/194; 426/96, 426/97, 98, 100, 139, 133, 291, 292, 289, 302

(56) References Cited

U.S. PATENT DOCUMENTS

| | | | |
|---|---|---|---|
| 2,745,749 A | 5/1956 | Feuge et al. | 99/118 |
| 3,608,070 A | * 9/1971 | Nouvel | 514/772.5 |
| 3,806,603 A | * 4/1974 | Gaunt et al. | 514/783 |
| 4,487,786 A | 12/1984 | Junge | 426/302 |
| 5,430,021 A | * 7/1995 | Rudnic et al. | 514/14 |
| 5,516,536 A | 5/1996 | Mikkelsen et al. | 426/99 |

FOREIGN PATENT DOCUMENTS

| | | |
|---|---|---|
| DE | 2015315 | 9/1979 |
| EP | 0 374 301 | 6/1990 |
| EP | 0375240 | 6/1990 |
| EP | 0465801 | 1/1992 |
| JP | 50-38737 | * 4/1975 |
| JP | 57-170147 | 10/1982 |
| JP | 4-27355 | 1/1992 |
| JP | 8-332064 | 12/1996 |
| JP | 9-206016 | 8/1997 |
| JP | 10-4863 | 1/1998 |
| JP | 10-150928 | 6/1998 |

OTHER PUBLICATIONS

Derwent–Acc–No 1975–69660W (1975).*

* cited by examiner

*Primary Examiner*—Joseph D. Anthony
(74) *Attorney, Agent, or Firm*—Westerman, Hattori, Daniels & Adrian, LLP

(57) ABSTRACT

A coming layer agent is provided which can substantially avoid water from transferring from a food substrate to a "coatings", such as a sheet and a coating, even when the food has been freeze-preserved, and which can prevent a decrease in crispness of the "coatings" after the food has been cooked by a microwave oven.

A coating layer agent composition for frozen foods to be microwave-heated, each of the foods comprising a food substrate and a "coatings", is featured in containing an emulsifier, preferably acetylated monoglycerides and/or protein, and/or oil and fat. The composition can be used in the form of powder mixed with and adhered to silicon dioxide. In this case, the composition can contain a coating layer agent preferably in the range of 100–250 weight % for silicon dioxide, and also can contain thermo-coagulating protein. A frozen food to be microwave-heated, which comprises a food substrate and a "coatings", is featured in that a layer composed of a coating layer agent, preferably a layer of the coating layer agent of the present invention, capable of maintaining a low vapor permeability after cooking by microwave heating and during freeze-preservation of the food, is interposed between the food substrate and the "coatings". The frozen food to be microwave-heated of the present invention may be deep-fried food with a coating or a sheet. In this case, the "coatings" is designed to be adapted for microwave heating. When the frozen food is provided in the packaged form, a moisture absorbent is preferably placed in a food package.

9 Claims, No Drawings

_(1)_

COATING AGENT FOR COOKING RANGE HEATED FROZEN FOOD COMPRISING CORE FOOD AND LAYER OF COATING, AND FOOD USING THE SAME

TECHNICAL FIELD

The present invention relates to a frozen food to be microwave-heated. More particularly, the present invention relates to a frozen fried food to be microwave-heated which is endurable for freeze-preservation.

Also, the present invention relates to a fried food which can remarkably suppress moisture absorption of coating and/or sheet not only immediately after production but also during freeze-preservation, and which can maintain crispness in eating even when the food has been heated again by a microwave oven after the preservation.

In the present invention, the term "freezing" means temperatures below 0° C.

BACKGROUND ART

Generally, it is important in fried foods that their coating and/or sheet (hereinafter called "coatings") provide crispness when eaten. Such crispness in eating can be usually obtained in fried foods immediately after being externally heated by, e.g., frying or using a toaster oven. On the other hand, cooing utilizing internal heating with a microwave oven has a difficulty in providing the crispness in eating because the "coatings" absorb water vapor evaporated from the interior of a food during the cooking.

Recently, various techniques have been proposed as means for preventing "coatings" from absorbing moisture when frozen foods are cooked by a microwave oven. As a result, some techniques have succeeded in suppressing moisture absorption of "coatings" at a satisfactory level immediately after freezing or after freeze-preservation under a condition below −30° C. Even with application of those techniques, there still remains such a problem that, when frozen fried foods are preserved at temperatures higher than −30° C., "coatings" absorb moisture during freeze-preservation before the frozen foods are microwave-heated, and crispness is deteriorated.

DISCLOSURE OF THE INVENTION

In the case of producing frozen fried foods, each of which is to be microwave-heated and comprises a food substrate and "coatings", there are two major problems. The first problem is that the "coatings" forming an outer surface of the food absorbs moisture evaporated from the interior of the food during microwave heating. The second problem is that the "coatings" absorbs moisture during freeze-preservation.

Those phenomena are disadvantageous in changing the texture of the food after being microwave-heated, particularly a texture of the "coatings", into a gummy or loose texture without crispness, and hence providing a poor texture far from that of foods just after being fried.

Of the above two problems, the second problem of "moisture absorption of the "coatings" during freeze-preservation" is recognized as a major problem only after the first problem of "moisture absorption of the "coatings" during microwave heating" has been solved.

In other words, only those persons, who have techniques capable of reproducing a good texture when frozen foods are cooked by a microwave oven immediately after freezing, can recognize that the good texture is not reproduced when the frozen foods are cooked by a microwave oven after freeze-preservation at temperatures higher than −30° C. Accordingly, the above two problems must be solved for producing frozen fried foods to be microwave-heated at a level nearer to perfection.

There have been proposed various techniques for dealing with the first problem of "moisture absorption of the "coatings" during microwave heating" of the above two problems. One preferable technique is to employ a batter composition, which contains heat treatment flour, high-amylose starch, etc., for "coatings". More preferably, the batter composition contains dextrin and an emulsifier in addition to the above components. It has been confirmed that, when foods are fried using the batter having such a composition, the formed coating have a porous structure. Because of the porous structure, moisture evaporated when the fried food is microwave-heated after freezing is allowed to escape to the outside of the food through the coating, and therefore moisture absorption of the coating during the microwave heating is suppressed. By employing the above technique, the frozen fried foods can provide crispness, when microwave-heated, comparable to that obtainable with externally heated foods. As a matter of course, the second problem of "moisture absorption of the "coatings" during freeze-preservation" cannot be recognized as an explicit problem without utilizing the above technique. This is because it is not clear that disappearing of the crispness is attributable to which one of moisture absorption during microwave heating or moisture absorption during freeze-preservation.

An object of the present invention is therefore to provide a frozen fried food which is substantially free from the occurrence of transfer of moisture from a food substrate to "coatings" such as, in particularly, a sheet and a coating not only immediately after the food has been frozen, but also when the food is freeze-preserved at a comparatively high temperature and after the food has been freeze-preserved for a long period of time, and which is capable of preventing a decrease in crispness of the "coatings" after the food has been cooked by a microwave oven. Another object of the present invention is to provide "coatings" suitable for microwave heating, a vapor pressure regulating technique, and a technique for preventing moisture absorption during freeze-preservation, which are necessary for producing the frozen fried food.

As a result of intensively conducting studies to achieve the above objects, the inventors have found that the crispness of the "coatings" can be maintained even when the frozen fried food is freeze-preserved at a comparatively high temperature, by employing the "coatings" suitable for microwave heating which does not easily absorb moisture evaporated during the microwave heating, treating the food substrate with a coating layer agent having a low vapor permeability, and placing a moisture absorbent in a food package during freeze-preservation. The present invention has been accomplished based on the above finding.

The present invention resides in a coating layer agent composition for frozen foods to be microwave-heated, each of the foods comprising a food substrate and a "coatings", wherein the composition contains an emulsifier, preferably acetylated monoglycerides and/or protein, and/or oil and fat. The composition can be used in the form of powder mixed with and adhered to silicon dioxide. Accordingly, the present invention resides in a coating layer agent composition for frozen foods to be microwave-heated, each of the foods comprising a food substrate and a "coatings", wherein the composition contains an emulsifier, and/or acetylated monoglycerides and/or protein, and/or oil and fat, the composition being preferably in the form of powder mixed with and adhered to silicon dioxide. The composition contains a coating layer agent preferably in the range of 100–250 weight % for silicon dioxide. Accordingly, the present invention resides in a coating layer agent composition for frozen foods to be microwave-heated, each of the foods comprising a food substrate and a "coatings", wherein the composition contains an emulsifier, preferably acetylated monoglycerides and/or protein, and/or oil and fat, the composition being in the form of powder mixed with and adhered to silicon dioxide in the range of 100–250 weight % for silicon dioxide. The composition may further contain thermo-coagulating protein. Accordingly, the present invention resides in a coating layer agent composition for frozen foods to be microwave-heated, each of the foods comprising a food substrate and a "coatings", wherein the composition contains an emulsifier, preferably acetylated monoglycerides and/or proteins, and/or oil and fat, as well as thermo-coagulating protein, the composition being in the form of powder mixed with and adhered to silicon dioxide preferably in the range of 100–250 weight % for silicon dioxide.

Also, the present invention resides in a frozen food to be microwave-heated, which comprises a food substrate and a "coatings", wherein a layer of a coating layer agent capable of maintaining a low vapor permeability after cooking by microwave heating and during freeze-preservation of the food, is interposed between the food substrate and the "coatings". The coating layer agent contains an emulsifier, preferably acetylated monoglycerides and/or protein, and/or oil and fat. Accordingly, the present invention resides in a frozen food to be microwave-heated, each of the foods comprising a food substrate and a "coatings", wherein a layer of a coating layer agent capable of maintaining a low vapor permeability after cooking by microwave heating and during freeze-preservation of the food is interposed between the food substrate and the "coatings", the coating layer agent containing an emulsifier, preferably acetylated monoglycerides and/or protein, and/or oil and fat. The coating layer agent may be used in the form of powder mixed with and adhered to silicon dioxide. Accordingly, the present invention resides in a frozen food to be microwave-heated, each of the foods comprising a food substrate and a "coatings", wherein a film of a coating layer agent capable of maintaining a low vapor permeability after cooking by microwave heating and during freeze-preservation of the food is interposed between the food substrate and the "coatings", the coating layer agent containing an emulsifier, preferably acetylated monoglycerides and/or protein, and/or oil and fat, and being preferably in the form of powder mixed with and adhered to silicon dioxide. The powder contains the coating layer agent in the range of 100–250 weight % for silicon dioxide. The powder may further contain thermo-coagulating protein.

Further, according to the present invention, the frozen food to be microwave-heated is in the form of a deep-fried food with a coating or a sheet formed. Thus, the present invention resides in a frozen food to be microwave-heated, each of the foods comprising a food substrate and a "coatings" and being in the form of a deep-fried food with a coating or a sheet formed, wherein a layer of a coating layer agent capable of maintaining low a vapor permeability after cooking by microwave heating and during freeze-preservation of the food is interposed between the food substrate and the "coatings".

The "coatings" is designed to be adapted for microwave heating, and preferably contains any of heat treatment flour, dextrin and high-amylose starch. Thus, the present invention resides in a frozen food to be microwave-heated, each of the foods comprising a food substrate and a "coatings" and being in the form of a deep-fried food with a coating or a sheet, the coat being designed to be adapted for microwave heating and preferably containing any of heat treatment flour, dextrin and high-amylose starch, wherein a layer of a coating layer agent capable of maintaining a low vapor permeability after cooking by microwave heating and during freeze-preservation of the food is interposed between the food substrate and the "coatings". The emulsifier of the "coatings" may be fatty acid ester of polyglycerin or sucrose ester. Also, the emulsifier preferably has an HLB value not higher than 10. Preferable concrete examples of the heated food with a coating or a sheet, according to the present invention, include spring rolls, croquettes, fries, fritters, deeply fried foods, and fried foods with thin "coatings". Moreover, when the frozen food is provided in the packaged form, a moisture absorbent is placed in a food package. The frozen food to be microwave-heated of the present invention is adapted for freeze-preservation preferably at temperatures not lower than −30° C., i.e., at temperatures where the saturated vapor pressure is not lower than 0.29 mmHg. More preferably, the frozen food to be microwave-heated of the present invention is adapted for freeze-preservation at temperatures where the saturated vapor pressure is not lower than 0.79 mmHg.

BEST MODE FOR CARRYING OUT THE INVENTION

Foods, to which the present invention is applied, are any desired heated foods each comprising a food substrate and a "coatings", which are suitable for being frozen and must be crispy in part or entirety thereof after being heated by a microwave oven.

Appropriate examples of those foods are fried-in-oil foods with "coatings". Specifically, those examples include fried foods with batter and bread crumb applied to their surfaces, such as croquettes and fries, fried foods with batter, bread crumb and other suitable coat materials covering their surfaces, such as fritters, deeply fried foods, and fried foods with thin coats; and rolled foods including foods substrates, similarly to the above coated foods, which are rolled by sheets.

Moisture absorption of "coatings" of fried foods or sheets of rolled foods during freeze-preservation occurs as such a phenomenon that water vapor sublimated from food substrates having a high moisture content is absorbed by the "coatings", which mainly comprise flour and/or starch and have a low moisture content. Therefore, an extent of the moisture absorption perfectly depends on a saturated vapor pressure (saturated sublimated vapor pressure) at the temperature during the freeze-preservation.

Saturated vapor pressures of ice are given, for example, by −50° C.=0.03 mmHg, −30° C.=0.29 mmHg, −20° C.=0.79 mmHg, and −10° C.=1.95 mmHg. Thus, the saturated vapor pressure increases as the temperature rises (there is a relationship of function between a logarithm of the saturated vapor pressure of ice and the reciprocal of temperature on the bases of the Clapeyron's equation; $dP/dT = \Delta H/T\Delta V$).

Accordingly, an extent of moisture absorption of the "coatings" during freeze-preservation also increases with a rise in temperature.

The vapor pressures under the frozen condition are lower values in comparison with those at the normal temperature.

Considering practical freeze-preservation, however, when a frozen fried food is preserved at −10° C., an atmosphere vapor pressure of the "coatings" is almost equal to the saturated vapor pressure =1.95 mmHg because of the presence of a food substrate having a high moisture content. The vapor pressure of 1.95 mmHg corresponds to a relative humidity of 11.1% at 20° C. and 6.1% at 30° C.

In other words, preserving frozen fried foods at −10° C. is equivalent to preserving at 30° C. with a relative humidity of 6.1%. Moisture of "coatings" of deep-fried foods such as croquettes is in the range of 5 to 10%. The example of flour and/or starch based food of which moisture is equal to that of croquettes and which is preserved at the normal temperature is Japanese rice cracker. When the rice cracker is preserved at 30° C. with a relative humidity of 6.1%, an amount of moisture in the rice cracker after absorbing moisture is about 5 g/100 g (dry basis), and these rice cracker exhibit higher breaking stress than before the moisture absorption; namely, they are hardened. Among flour and/or starch based foods, cookie has less moisture, in the range of 2 to 3%, than that of "coatings" of frozen fried foods. As the rice cracker, however, the cookie also absorbs moisture and are softened when preserved at the same condition. Thus, the rice cracker and the cookie are both "damped" by absorbing moisture. Similarly to the rice cracker and the cookie, the frozen fried foods are also "damped" in a temperature range near −10° C. where the saturated vapor pressure is high.

As a result of being damped, the crispness disappears (i.e., the foods are softened or hardened) and a gummy texture occurs (i.e., the breaking stress increases) when eating the foods.

Means for preventing the "coatings" from absorbing moisture during freeze-preservation are only realized by reducing the vapor pressure. The most effective means for that purpose is to lower the temperature. Another effective means is to suppress water vapor generated from food substrates that are vapor sources, or to absorb water vapor that has been generated.

The most effective means for reducing the vapor pressure is to lower the temperature. More specifically, for example, the saturated vapor pressure is 0.03 mm Hg at −50° C. and 0.29 mmHg −30° C. These saturated vapor pressures correspond respectively to 0.2% and 1.7% calculated in terms of a relative humidity at 20° C. At these low levels of relative humidity, cookies, rice crackers and other similar foods are hardly moistened. "coatings" of frozen fried foods are also hardly moistened such low temperatures. A problem of moisture absorption of "coatings" of frozen fried foods occurs at temperatures of higher than −20° C., especially higher than −10° C., where the saturated vapor pressure is relatively high.

<With Regard to Coating Layer for Food Substrates>

A conceivable method for suppressing water vapor generated from food substrates of the frozen fried foods is to cover the food substrates with coating layer. A coating layer agent for food substrate is employed to form a thin coating film, which has a low vapor permeability, around the food substrates. Usually, the thin coating film is stick to the food substrate and fulfills its function. However, the thin coating film may be stick to the "coatings". In such condition, it is still effective so long as it is formed between the food substrate and the "coatings".

An emulsifier or protein is used as the coating layer agent for the food substrate. If polysaccharides having high water solubility are used as the coating layer agent, a polysaccharide film would absorb moisture by itself and become a deteriorated-texture layer, and could not sufficiently suppress the generation of water vapor. Other disadvantages of polysaccharides are that the film strength would be reduced upon contacting with a better solution, and it would take a time to form the film. If fats, oils or waxes having a high hydrophobic property are used as the coating layer agent, there would occur such disadvantages that a film of the coating layer agent is melted upon frying in oil to disappear after the cooking, and a batter solution is hard to attach to the film of the coating layer agent. In view of the above, an emulsifier or protein having both hydrophilic and hydrophobic properties is suitable as the coating layer agent for food substrate. Preferably examples are acetylated monoglycerides as the emulsifier and casein as the protein. The acetylated monoglycerides are diacetates or monoacetates of monoglycerides of fatty acids. Preferable fatty acids include a lauric acid, myristic acid, oleic acid, palmitic acid, stearic acid, etc. Among these examples, the monoglyceride in which a fatty acid mainly comprises a stearic acid and a degree of acetylation is low is most preferable.

Other emulsifier is often used for emulsifying oil in water or water in oil. The emulsifier used in such a case has a high emulsifying capacity, but exhibits no or a very weak film forming ability in itself. The emulsifier used in the present invention is featured as no or very weak emulsifying capacity, but having a high film forming ability in itself.

<Form of Coating Layer Agent in Use>

The coating layer agent can be used in any desired form, but it is preferably in the form of liquid or powder. When the coating layer agent is used in the form of liquid, it can be prepared by melting under heating or by adding a solvent such as ethanol, and is preferably applied by such methods as spraying, dipping or curtain coating. When the coating layer agent is used in the form of powder, the powder can be obtained by adsorbing the coating layer agent to a base material such as starch, fiber, silicon dioxide. Regarding base material, silicon dioxide is preferably from the viewpoints of stability and its water absorbing capacity. Further, the powder may be used solely or as a blend with another material such as thermo-coagulating protein. The powder is preferably applied to food substrates, for example, by spraying or sprinkling the powder.

<With Regard to Thermo-coagulating Protein Added>

When foods with coating layers formed are fried, the "coatings" of the food sometimes detached from the food substrates. Such a phenomenon can be avoided by adding thermo-coagulating protein to the coating layer agent.

<Amount of Coating Layer Agent for Food Substrate Used>

By adding the coating layer agent to such an extent that the food substrate is completely coated, the vapor pressure can be remarkably suppressed. Using the coating layer agent in such an amount however deteriorates the food in tastes and texture. From that point of view, therefore, the amount of the coating layer agent to be added is spontaneously restricted, and therefore a suppressing effects of the vapor pressure is limited. Incidentally, suppressing the vapor pressure by a coating layer has the same meaning as lowering the temperature during preservation.

Accordingly, in a preferable mode of the present invention, a frozen food to be microwave-heated is featured in that a food substrate is covered with a film of a coating layer agent, which does not absorb moisture, to which a batter solution adheres well, and which suppresses water vapor generated from the food substrate after frying in oil, freeze preservation, the coating layer agent containing an emulsifier, preferably acetylated monoglycerides and/or protein, and/or oil and fat, and microwave heating.

When the frozen food to be microwave-heated of the present invention is a deep-fried food with a "coatings", the "coatings" is preferably designed to be adapted for microwave heating.

The "coatings" designed to be adapted for microwave heating contains any of heat treatment flour, dextrin and high-amylose starch. The "coatings" may further contain an emulsifier. Preferably examples of the emulsifier are fatty acid ester of polyglycerin and sucrose ester. Also, the emulsifier preferably has an HLB value not higher than 10.

<With Regard to Moisture Absorbent>

A conceivable method for absorbing water vapor once generated is to place a moisture absorbent in a food package.

As described above, the amount of the coating layer agent to be added is spontaneously restricted from the viewpoints of taste and texture, and therefore a suppressing effect of the vapor pressure is limited. Hence, when the frozen fried food is in the packaged form, the moisture absorbent is placed in a food package to absorb water vapor once generated in combination with the use of the coating layer agent. The method of placing a material having a high moisture absorptivity, which is generally called a moisture absorbent or desiccating agent, in a package along with a fried food is effective in causing the moisture absorbent to absorb water vapor generated from a food substrate before the water vapor is absorbed by the "coatings", and hence reducing a relative humidity at the temperature during preservation.

A reduction in relative humidity is equivalent to reducing the temperature during preservation from the standpoint of the saturated vapor pressure. For example, reducing the relatively humidity at −10° C. to 40% is equivalent to preserving the food at −20° C.

Such a method is effective because it is sample and is not required to be held in contact with the food. However, once the moisture absorbent has lost its ability of absorbing moisture, that is to say, the moisture absorbing ability has been saturated, the moisture absorbent is no longer effective. It is therefore practically impossible to solve the problem of "moisture absorption of a "coatings" during freeze-preservation" by, as disclosed in Japanese Unexamined Patent Application Publication No. 5-64574, using the moisture absorbent along. Specifically, extension of a preservation period is related to an amount of the moisture absorbent used, and there exists competition on absorption of water vapor between the "coatings" and the moisture absorbent. Even if the moisture absorbent absorbs water vapor with priority, the "coatings" eventually start absorbing moisture after the moisture absorbent is saturated with moisture.

By placing the moisture absorbent in a package of the frozen fried food of the present invention, the frozen fried food can be virtually regarded as corresponding to a food which is freeze-preserved at temperatures not lower than −30° C., i.e., at temperatures where the saturated vapor pressure is not lower than 0.29 mmHg. It is also possible to bring the frozen fried food into a condition equivalent to that of a food which is freeze-preserved at temperatures not lower than 20° C., i.e., at temperatures where the saturated vapor pressure is not lower than 0.79 mmHg.

There are no restrictions on types of the moisture absorbent. Any of moisture absorbents generally used in foods, such as silica gel, quick lime, and calcium chloride, is usable. An amount of the moisture absorbent varies over a wide range depending on various factors such as the type of the moisture absorbent, the type of the food, the temperature during preservation, and the desired shell life. In general, an amount of the moisture absorbent is in the range of 1 to 80 weight %, more typically in the range of 2 to 20 weight %, on the basis of the food weight. The moisture absorbent may be in direct contact with the food in a package, or may be capsulated in a fine-porous plastic sheet having such a pore size as allowing water vapor to permeate through the sheet, but preventing particles of the moisture absorbent form passing through the sheet. The fine-porous plastic sheet is known to those skilled in the art, and can be manufactured from various plastic materials such as polyolefins, vinyl polymers, polyamides, polyurethanes, and polyesters.

The frozen fried food can be packaged using any usual package that is adapted for not only preservation under a frozen condition along with the moisture absorbent, but also reheating by a microwave oven. The package should be tight against water vapor, and may be a bag manufactured from materials such as polyurethanes, polyolefins, polyesters, and polyamides.

Moisture absorption of the "coatings" of the frozen fried food during microwave heating can be suppressed by making the "coatings" porous by frying in oil, because the porous structure allows moisture which come from the food when the fried food is microwave-heated after freezing to escape to the outside of the food through the "coatings". Therefore, the frozen fried food exhibits crispness, when microwave-heated, comparable to that obtainable with externally heated foods. By employing, as a coating layer agent for the food substrate, an emulsifier, protein, etc. having both hydrophilic and hydrophobic properties, it is possible to form a film which does not absorb moisture by itself, but has such a property as allowing a batter solution to adhere well to the form, and which functions suppress water vapor from a food substrate after frying in oil. The coating layer agent is used in such an amount as not affecting the food in points of taste and texture.

By placing a material having a high moisture absorptivity, which is called a moisture absorbent or desiccating agent, in a package along with the fried food, water vapor generated from the food substrate can be absorbed by the moisture absorbent before the water vapor is absorbed by the "coatings". As a result, a relative humidity at the temperature during preservation can be reduced.

When foods with coating layers formed are fried, the "coatings" of the food sometimes detached from the food substrates: Such a phenomenon can be avoided by adding thermo-coagulating protein to the coating layer agent.

Details of the present invention will be described in conjunction with Examples. It is to be noted that the present invention is limited in no way by the following Examples.

EXAMPLE 1

55 Weight parts of water, an emulsifier mixture containing 3 weight parts of fat and oil, 20 weight parts of salad oil, 10 weight parts of dextrin, and 15 weight parts of high-amylose starch [made by Nichiden Chemicals K.K., containing 70% of amylose] were added together, and mixed by a high-speed agitator. A battery solution for fries were thereby prepared. Then, a croquette substrate was dipped in the batter solution so that batter adhered to it, and thereafter bread crumb was applied to it, thereby preparing a fry base. The resulting fry base was fried in a known manner, and then preserved at −50° C. after freezing. (Inventive food 1)

EXAMPLE 2

55 Weight parts of water, an emulsifier mixture containing 3 weight parts of oil and fat, 20 weight parts of salad oil, 10 weight parts of dextrin, and 15 weight parts of high-amylose starch [made by Nichiden Chemicals K.K., containing 70% of amylose] were added together, and mixed by a high-speed agitator. A batter solution for fries were thereby prepared. Then, a croquette substrate was dipped in the batter solution so that batter adhered to it, and thereafter bread crumb was applied to the croquette substrate, thereby preparing a fry base. The resulting fry base was fried in a known manner, and then preserved at −20° C. after freezing. (Inventive food 2)

EXAMPLE 3

55 Weight parts of water, an emulsifier mixture containing 3 weight parts of oil and fat, 20 weight parts of salad oil, 10 weight parts of dextrin, and 15 weight parts of high-amylose starch [made by Nichiden Chemicals K.K., containing 70% of amylose] were added together, and mixed by a high-speed agitator. A battery solution for fries were thereby prepared. Then, a croquette substrate was dipped in the batter solution so that battery adhered to it, and thereafter bread crumb was applied to the croquette substrate, thereby preparing a fry base. The resulting fry base was fried in a known manner, and then preserved at −50° C. after freezing. (Inventive food 3)

EXAMPLE 4

A batter solution was prepared and a croquette was fried and then preserved at −20 C. in the same manner as in Example 1 except that a croquette substrate was dipped in the melted acetylated monoglyceride by heating, thereby coating the croquette perform with a film of the acetylated monoglyceride. (Inventive food 4)

EXAMPLE 5

A batter solution was prepared and croquette was fried and then preserved at −20 C. in the same manner as in Example 1 except that silica gel was placed in a package of the croquette when served. (Inventive food 5)

EXAMPLE 6

A batter solution was prepared and a croquette was fried and then preserved in the same manner as in Example 4 except that the croquette was preserved at −10° C. (Inventive food 6)

EXAMPLE 7

A batter solution was prepared and a croquette was fried and then preserved in the same manner as in Example 5 except that the croquette was preserved at −10° C. (Inventive food 7)

EXAMPLE 8

A batter solution was prepared and a croquette was fried and then preserved at −10° C. in the same manner as in Example 1 except that a croquette substrate was dipped in an acetylated monoglyceride, which was obtained by dissolution under heating, thereby coating the croquette perform with a film of the acetylated monoglyceride, and silica gel was placed in a package of the croquette. (Inventive food 8)

EXAMPLE 9

Acetylated monoglyceride in amount twice silicon dioxide as a base material was melted by heating, and then mixed to the silicon dioxide under agitation, following which the mixture was cooled down to the room temperature. Coarse powder of the acetylated monoglyceride was thereby obtained. The coarse powder was frozen and pulverized, whereby fine powder of the acetylated monoglyceride being stable at the room temperature was finally prepared. A batter solution was prepared and a croquette was fried and then preserved at −10° C. in the same manner as in Example 1 except that a croquette substrate was coated with the fine powder of the acetylated monoglyceride, and that silica gel was was placed in a package of the croquette. (Inventive food 9)

EXAMPLE 10

Acetylated monoglyceride in amount twice silicon dioxide as a base material was melted by heating, and then mixed to the silicon dioxide under agitation, following which the mixture was cooled down to the room temperature. Coarse powder of the acetylated monoglyceride was thereby obtained. The coarse powder was frozen and pulverized and then added with thermo-coagulating protein, whereby fine powder of the acetylated monoglyceride being stable at the room temperature was finally prepared. A batter solution was prepared and a croquette was fried and then preserved at −10° C. in the same manner as in Example 1 except that a croquette substrate was coated with the fine powder of the acetylated monoglyceride, and that silica gel was placed in a package of the croquette. (Inventive food 10)

COMPARATIVE EXAMPLE 1

60 Weight parts of water, 10 weight parts of salad oil, and 25 weight parts of soft wheat flour were added together to prepare a batter solution. Then, a croquette substrate was dipped in the batter solution so that batter adhered to it, and thereafter bread crumb was applied to the croquette substrate, thereby preparing a fry base. The resulting fry base was fried in a known manner, and then preserved at −50° C. after freezing. The above frozen croquette were freeze-preserved at −50° C. for 6 months, at −20° C. for 1 months and 3 months, and at −10° C., for two weeks and 1 month. After the freeze-preservation, the frozen croquettes were cooked again by a microwave oven such that a temperature at the center of each croquette reached 70° C. Sensory evaluation was conducted by ten panels for microwave heated croquettes. Sensor results are listed in Table 1.

The results of the sensory evaluation are rated in accordance with the following evaluation criteria, and scored as an average value calculated from the total rated points.

5 points: the coating of the croquette had substantially the same crispness as immediately after frying in oil.

3 points: The coating of the croquette was crispy to some extent, but sticky.

1 point: The coating of the croquette had no crispness and was every sticky.

TABLE 1

|  | Preservation Period | | | | |
| --- | --- | --- | --- | --- | --- |
|  | −50° C. for 6 months | −20° C. for 1 month | −20° C. for 3 months | −10° C. for 2 weeks | −10° C. for 1 month |
| Example 1 | 4.7 | — | — | — | — |
| Example 2 | — | 3.3 | 2.9 | — | — |
| Example 3 | — | — | — | 2.6 | 2.5 |
| Example 4 | — | 4.3 | 4.0 | — | — |
| Example 5 | — | 4.1 | 3.9 | — | — |
| Example 6 | — | — | — | 4.1 | 3.7 |
| Example 7 | — | — | — | 3.8 | 3.5 |

TABLE 1-continued

| | Preservation Period | | | | |
|---|---|---|---|---|---|
| | −50° C. for 6 months | −20° C. for 1 month | −20° C. for 3 months | −10° C. for 2 weeks | −10° C. for 1 month |
| Example 8 | — | — | — | 4.6 | 4.5 |
| Example 9 | — | — | — | 4.5 | 4.3 |
| Example 10 | — | — | — | 4.5 | 4.4 |
| Com. Ex. 11 | 1.6 | — | — | — | — |

As seen from the result of Table 1, in the case of preserving the croquettes at −50° C., the crispness of the coating is held for a long period of preservation over 6 months by using a coating combination suitable for the frozen fried food cooked by a microwave oven. On the other hand, it is seen that, in the case of preserving the croquettes at −20° C. and −10° C., the crispness of the coating greatly depends on the preservation temperature and the preservation period.

Further, looking at the evaluation for the results of Example 3, the scores of the sensory evaluation seem to be noted affected by the preservation period, but this is attributable to the fact that moisture in the coating had already reached substantially a phase equilibrium condition under the saturated vapor pressure in the preservation period of two weeks, and hence no further changes occurred after the two weeks. Also, as shown in the evaluation of Examples 6 and 7, using only a coating layer of the acetylated monoglyceride or using only silica gel is effective in improving a texture to some extent.

But, the effects are greater in Example 8–10 compared to Examples 6, 7, Examples 8–10 revealed that, even after a long period of preservation at −10° C., the croquettes maintain a light and crispy texture comparable to immediately after the frying in oil.

INDUSTRIAL APPLICABILITY

A frozen fried food is provided which is substantially free from the occurrence of transfer of moisture, etc. from a food substrate to a "coatings" not only immediately after the food has been frozen, but also when the food is freeze-preserved at a comparatively high temperature and after the food has been freeze-preserved for a long period of time, and which is capable of preventing a decrease in crispness of the "coatings" after the food has been cooked by a microwave oven.

What is claimed is:

1. A coating layer agent composition comprising:

acetylated monoglycerides, wherein said composition is in the form of a powder mixed with and adhered to silicon dioxide at a concentration range of 100–250 weight % of acetylated monoglycerides to silicon dioxide.

2. A coating layer agent composition according to claim 1 wherein said composition further contains thermo-coagulating protein.

3. A frozen food to be microwave-heated comprising:

A food substrate and a first coating and/or sheet covering said food substrate, wherein a second coating of a composition consisting essentially of acetylated monoglycerides is interposed between said food substrate and said first coating and/or sheet, and said frozen food is freeze-preserved after cooking by heating; with the proviso that said second coating of a composition consisting essentially of acetylated monoglycerides is optionally in the form of a powder mixed with and adhered to silicon dioxide.

4. The frozen food to be microwave-heated according to claim 3, wherein said frozen food is provided in the packaged form, and a moisture absorbent is placed in a food package.

5. The frozen food to be microwave-heated according to claim 3, wherein said composition of the second coating contains acetylated monoglycerides only.

6. The frozen food to be microwave-heated according to claim 3, wherein said frozen food to be microwave-heated is deep-fried food.

7. The frozen food to be microwave-heated according to claim 6, wherein said first coating and/or said sheet is designed to be adapted for microwave heating.

8. The frozen food to be microwave-heated according to claim 3, wherein said composition of the second coating is in the form of powder mixed with and adhered to silicon dioxide.

9. The frozen food to be microwave-heated according to claim 8, wherein said composition of the second coating contains acetylated monoglycerides in the range of 100–250 weight % for silicon dioxide.

* * * * *